United States Patent [19]

German

[11] 4,208,636
[45] Jun. 17, 1980

[54] LASER APPARATUS

[75] Inventor: Kenneth R. German, Fairport, N.Y.

[73] Assignee: Burleigh Instruments, Inc., Fishers, N.Y.

[21] Appl. No.: 861,159

[22] Filed: Dec. 16, 1977

[51] Int. Cl.$^2$ ............................................. H01S 3/094
[52] U.S. Cl. .......................... 331/94.5 P; 331/94.5 F
[58] Field of Search ................... 331/94.5 C, 94.5 D, 331/94.5 F, 94.5 P; 350/171, 172

[56] References Cited

U.S. PATENT DOCUMENTS

| | | | |
|---|---|---|---|
| 3,438,694 | 4/1969 | Reid et al. | 350/171 |
| 3,970,960 | 7/1976 | Mollenauer | 331/94.5 F |
| 4,054,852 | 10/1977 | Nicolai | 331/94.5 P |

Primary Examiner—William L. Sikes
Attorney, Agent, or Firm—Martin LuKacher

[57] ABSTRACT

An infrared laser is described which is optically pumped by a pump laser operating at a visible wavelength. The polarization of the pump, is opposite from the lasing polarization, and is coupled colinearly with the laser beam by a Brewster angle polarization beam splitter in the laser beam path which reflects the pump polarization while transmitting the lasing polarization. Leakage of the pump polarization through the beam splitter provides a visible tracer propagating colinearly with the laser beam which permits the location of the invisible infrared beam and its alignment with respect to apparatus which utilizes the beam.

21 Claims, 5 Drawing Figures

LASER APPARATUS

The present invention relates to laser apparatus and particularly to laser apparatus with improved pumping means.

The invention is especially suitable for use in an infrared laser which is pumped by a visible laser and particularly for pumping infrared F center lasers with visible light.

Optical pumping of lasers has been accomplished by introducing the pump beam so that the pump beam is colinear with the optical path of the beam from the laser which is excited by the pump beam. U.S. Pat. No. 3,970,960 issued July 20, 1976 shows an infrared laser in which colinear pumping is obtained through the use of mirrors which define the laser resonant cavity which are highly reflective at infrared wavelengths of the laser, but are highly transmissive in the visible wavelengths of the pump. Such dichroic mirrors are difficult to design and expensive to manufacture. In U.S. Pat. No. 3,766,488 issued Oct. 16, 1973, the pump laser is located within the laser cavity of the pumped laser with the pump beam and laser beam colinear with each other. Such designs are also difficult and expensive. They are particularly unsuitable where the active laser medium which is pumped must be maintained at vacuum and low temperatures as is the case in F center infrared lasers, since the pump laser must then be located in a vacuum chamber of a dewar. In spite of the difficulties of colinear pumping, the use of a colinear pump for a laser which produces invisible light (e.g., an infrared laser) is especially desirable, since the pump beam is then available as a visible tracer for the alignment of the invisible laser beam with respect to other apparatus such as the mirrors and lenses inside or out of the laser cavity as well as with utilization apparatus for the laser beam.

Various means for introducing the optical pumping beam non-colinearly with respect to the optical path of the laser beam have also been suggested. These have involved the use of lenses and mirrors to project the pumping beam through the laser medium but at an angle with respect to the optical path of the cavity, (see U.S. Pat. No. 3,873,941 issued Mar. 25, 1975, which also mentions techniques for colinear pumping). The pumping beam can also be introduced by way of a prism, obliquely with respect to the optical path of the excited laser beam (see U.S. Pat. No. 3,903,483 issued Sept. 2, 1975).

Beam splitters have been used in connection with polarization switches as input and output couplers of laser beams in laser amplifiers. Such amplifiers are optically pumped, but by flash lamps, and the beam splitters are used in connection with polarizers, such as electro-optic rotators for purposes of switching the input or output beams to or from the laser amplifier rather than for optical pumping of the amplifier. Of course the input and output beams as well as the amplified beams are all at the same wavelength (see U.S. Pat. Nos. 3,453,559 issued July 1, 1969; 3,597,695 issued Aug. 3, 1971; and 3,914,710 issued Oct. 21, 1975).

It is a feature of the present invention to provide means for optically pumping a laser colinearly such that the pumping beam may be used as a tracer for alignment of the laser beam which is excited by the pump beam. These pumping means are particularly advantageous when the pump and lasing wavelengths are quite different, as when the lasing wavelengths are in the infrared and invisible while the pump wavelengths are visible. Another feature of the present invention is to enable the introduction of the pump with high coupling efficiency to the laser medium. In accordance with the invention the pump may be another laser but need not be located within the laser cavity. As such, the pumping means is especially suitable for use in lasers where the active medium must be maintained in a special environment, as at low temperature and at vacuum.

Accordingly, it is an object of the invention to provide improved laser apparatus.

It is another object of the invention to provide improved laser apparatus having means for optically pumping a laser so that the pumping radiation is introduced so that the pump beam and the laser beam which is excited by the pump beam are colinear with each other.

It is a further object of the invention to provide improved laser apparatus wherein a visible pump beam, as from a pump laser, is coupled to a laser medium to excite the medium to produce an invisible laser beam where the laser beam and the pump beam are colinear with each other thereby enabling the pump beam to provide a visible tracer for alignment and location purposes.

It is a still further object of the present invention to provide an improved infrared laser which is optically pumped by a visible laser where the pump beam is coupled to the active laser medium with high coupling efficiency.

Briefly described, laser apparatus embodying the invention makes use of a laser pump source which produces a pump beam of visible laser light. An active laser medium, preferably a F center crystal which can be excited to produce invisible light (in the infrared for the F center crystal), is located in a laser cavity provided by reflectors such as mirrors. The laser beam propagates along an optical path in the cavity. Also in the cavity there is disposed a polarization beam splitter which is in the path of the laser beam and oriented at an angle, preferably Brewsters angle, so as to transmit light having the polarization of the laser beam. The laser beam thus propagates along the optical path with minimum attenuation. The pump beam is polarized so as to be reflected, by the polarization beam-splitter, colinearly with the laser beam along the optical path of the cavity. To this end the pump beam is of opposite polarization to the laser beam. The pump beam is made incident by the reflectors in the laser cavity on the laser medium. The pump energy is absorbed in the laser medium and excites the laser medium to produce the laser beam. The visible pump beam however is transmitted partially in the polarization beam splitter and through the laser medium. Accordingly, the visible pump beam propagates colinearly with the invisible laser beam and affords a visible tracer for the location and alignment of the laser beam.

The foregoing and other objects, features and advantages of the present invention as well as the presently preferred embodiment thereof will become more apparent from a reading of the following description in connection with the accompanying drawings in which.

Figure 1:
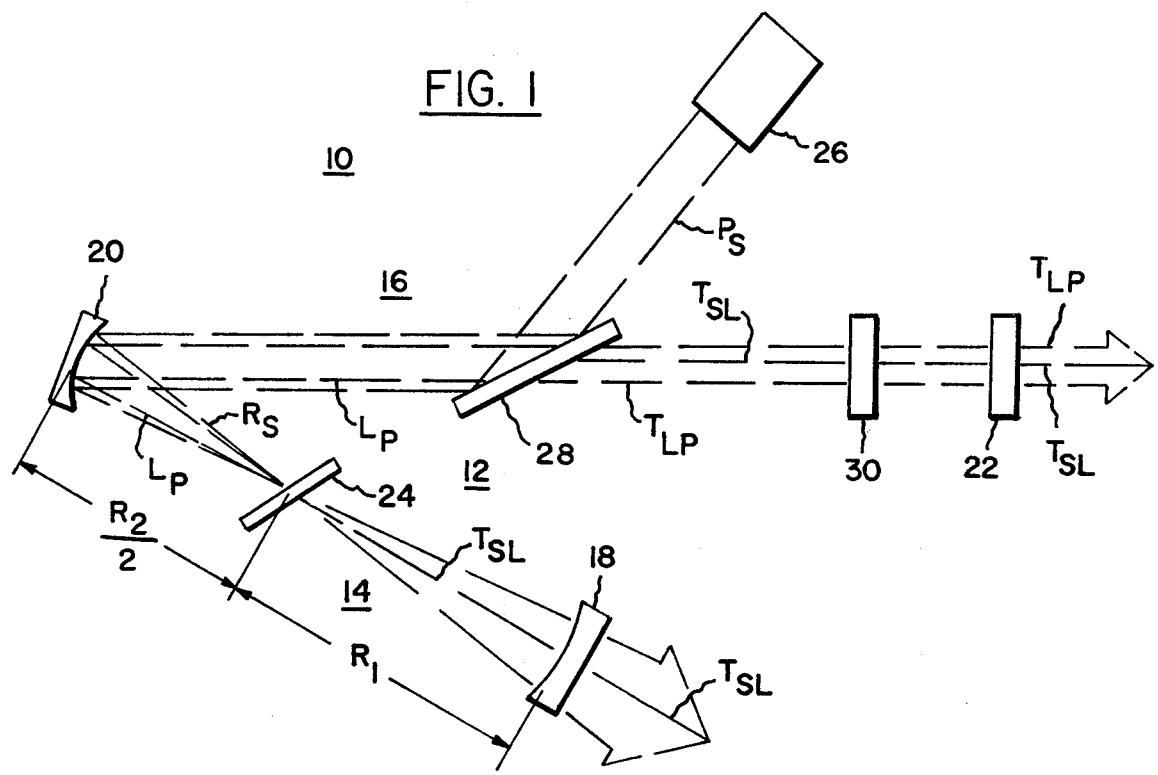
FIG. 1 is an optical schematic diagram of an infrared laser in accordance with the present invention.

Referring more particularly to FIG. 1, there is shown an infrared F center laser 10. The resonant cavity 12 of the laser has two arms 14 and 16 which are defined by means which provide three reflective surfaces. A concave mirror 18 defines a first of these reflective surfaces. This mirror has a radius $R_1$. The second of the reflective surfaces is defined by another concave mirror 20 of radius $R_2$. The third reflective surface is provided by a flat mirror 22 of infinite radius. The second mirror 20 is totally reflecting while either or both of the first and third mirrors 18 and 22 may be partially transmitting and provide output couplers for the beams which propagate along the optical path in the cavity 12 defined by the mirrors 18, 20 and 22.

The laser medium 24, which in this illustrative laser is an F color center crystal, such as lithium-doped potassium chloride (KCl) crystal, and the other elements in the cavity 12 may be located in a vacuum chamber dewar so that the crystal can be maintained at cryogenic temperatures and at vacuum where it operates as an active laser medium which exhibits continuous wave laser action when pumped by visible laser light. The third mirror 22 together with any tuning device may be located outside the vacuum chamber.

The mirrors 18, 20 and 22 are arranged to compensate the astigmatism introduced by the laser medium crystal plate 24. The laser medium crystal 24 is disposed at a focal point of the mirrors 18 and 20 which define the first arm 14 of the cavity 12. The laser mode is tightly focussed at the crystal 24. This focus is provided as shown in FIG. 1 by locating the center of the crystal 24 at a distance $R_2/2$ from the second mirror 20 and at a distance $R_1$ from the first mirror 18. The crystal 24 is oriented at the Brewsters angle with respect to the optical path in the cavity. By virtue of this orientation at the Brewster angle, the laser beam which is excited when the crystal is pumped is in the P polarization. As will be discussed more fully below the crystal 24 is oriented so that it absorbs S polarized light and fluoresces in P polarization. In addition to being oriented at Brewsters angle to the cavity 12 axis so that the P polarization has no scattering loss, the crystal axes are oriented so that the laser beam of P polarization falls along the crystal axes. In the case of the KCl:Li crystal this is the (110) crystal axis. The construction and orientation of such a crystal is described in U.S. Pat. No. 3,970,960 mentioned above.

The light which is reflected in the second arm 16 of the cavity between the second and third mirrors 20 and 22 is in a narrow or only slightly diverging beam. The spacing between the mirrors 20 and 22 is not critical since the beam is only slightly diverging in this arm 16 of the cavity.

In order to pump the F center crystal 24, a visible pump beam is obtained from a pump laser 26. This laser may be a krypton gas laser. The pump beam may initially be S polarized and is shown as $P_S$ in the drawing. A Brewsters angle polarization beam splitter 28 is located in the arm 16 of the cavity 12 and oriented at Brewsters angle with respect to both the laser beam and the pump beam. The location of the polarization beam splitter 28 between the second mirror 20 and third mirror 22 is not critical. It is located along the optical path (the axis of the cavity 12) such that the pump beam is introduced by reflection of the S polarization components thereof into the cavity colinearly with the laser beam. The laser beam and the pump beam may be of the same diameter. However, the pump beam which is reflected into the cavity and labeled $R_S$ to designate its S polarization is shown slightly wider than the laser beam, labeled $L_P$, to show that these beams are colinear with each other and overlap each other along the optical path in the cavity. While the pump beam is shown as S polarized, it may be unpolarized. The polarization beam splitter reflects the S polarization ($R_S$) and introduces that polarization into the cavity while transmitting the P polarization, which may be absorbed, by a filter not shown, located on the opposite side of the beam splitter 28 from the pump laser 26.

The second mirror 20 focusses the pump beam at the laser medium crystal 24 where the pump energy is absorbed and excites the medium 24 to produce the laser beam. It is a feature of this embodiment of the invention that it is not necessary to use a pump laser with very small divergence or low order mode structure, since the mirror 20 focusses the beam into a sufficiently small spot that a broad range of pump lasers can be used without degraded performance from the laser 10. A small amount of the pump beam passes through the laser medium 24 and is incident upon the mirror 18 where it is partially reflected and partially transmitted. The transmitted component is indicated in the drawing as $T_{SL}$ to represent that it is transmitted light of S polarization which leaks through the laser medium 24. Some of this light $T_{SL}$ also leaks through the mirror 18. If the mirror 18 is used as an output coupler, as indicated by the arrow on the righthand side thereof, the visible beam $T_{SL}$ serves as a visible tracer which may be used to locate the laser beam and to align the beam with respect to other components in the laser system, for example to align the utilization apparatus which uses the infrared invisible laser beam so that the laser beam is centered with respect to the utilization apparatus.

The pump beam, which is reflected from the mirror 18, again passes through the laser medium crystal 24 where still more energy is absorbed. Then the pump beam is recollimated at the second mirror 20 and directed towards the flat output mirror 22. Some of this reflected pump radiation is transmitted through the beam splitter 28 which does leak the S polarization while transmitting substantially all of the P polarized laser beam. The leakage S polarization which passes through the beam splitter 28 is shown as $T_{SL}$ in the drawing. The transmitted laser beam which is P polarized is indicated by the legend $T_{LP}$. These beams may pass through a tuning element 30 such as prism or birefringent filter so that wavelength tuning of the laser beam may be accomplished. The transmitted laser beam $T_{LP}$ which is in the infrared and invisible, passes together with the transmitted pump beam $T_{SL}$ through the mirror 22 which functions as an output coupler by being partially transmissive. The pump beam and the laser beam are colinear with each other at the output of the laser and the visible pump beam may be used as a tracer for location and alignment purposes. If desired the visible beam may be separated from the pump beam by using a suitable filter, for example, a silicon or germanium plate in the output beam, on the output side of the mirror 22 or the mirror 18, which is disposed at Brewsters angle and which totally attenuates the visible light but transmits the infrared laser beam with only negligible loss.

Figure 5:
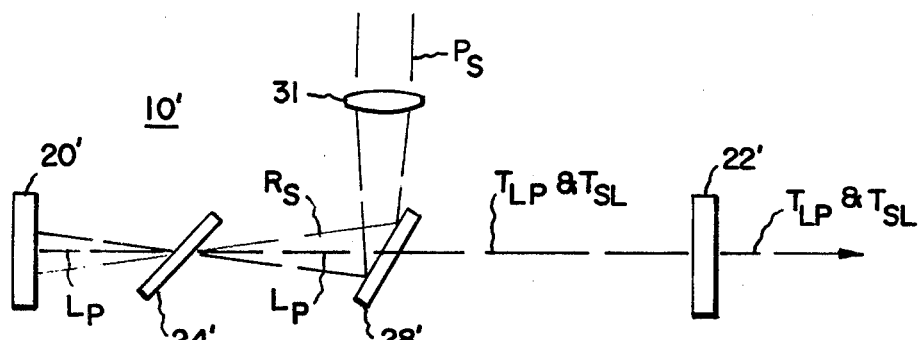
FIG. 5 is an optical schematic diagram of a laser similar to that shown in FIG. 1 but with a somewhat different cavity arrangement all in accordance with the invention.

FIG. 5 shows a laser 10' and a cavity 12' having but a single arm with flat mirrors 20' and 22' defining the cavity. The second of these mirrors 22' is partially transmitting and provides the output beam. The pump beam $P_S$ is introduced colinearly with the optical path (the cavity axis) by the Brewsters angle polarization beam splitter 28'. A lense 31 may be used to focus the S polarized beam after reflection (viz, the beam $R_S$) at the laser medium 24 (which may be a F center crystal). The transmitted pump beam $T_{SL}$ and laser beam $T_{LP}$ are both available from the output mirror 22'. The laser 10' operates in the same way as the laser 10 described in connection with FIG. 1, which laser 10 is presently preferred.

Figure 4:
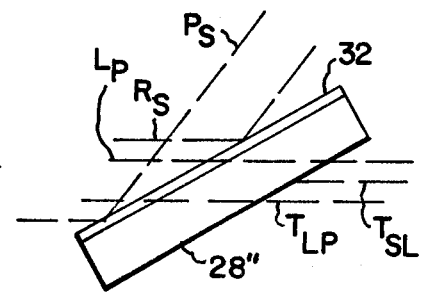
FIG. 4 is another illustration of a polarization beam splitter which may be used in the apparatus shown in FIG. 1 and which has a coating of thin dielectric films for increasing its reflectivity.

The polarization beam splitter is preferably a body of dielectric or semiconductive material in the form of a plate. Materials and thicknesses are selected such that the beam splitter has no appreciable absorption, suitably less than 0.05%, at the infrared laser wavelength and in the thickness used. Preferably the material should not be naturally birefringent since such birefringence would affect the tuning range of the laser and prevent the tuning element 30 from providing accurate tuning control. In the case of F center lasers, the plate is preferably a thin (e.g., 2 mm thick) plate of material selected from the group including $CaF_2$, $Z_nS_e$, $BaF_2$, Si, and Ge. The latter materials (silicon and germanium) are not preferred since they are substantially opaque at visible wavelengths and reduce the intensity of the visible tracer. At the present time a plate of $CaF_2$ is preferred. Such a plate 28" is shown in FIG. 4 as having a coating 32 of thin film dielectric materials. Such thin films, suitably in a stack, or multiplicity of such films, increase the reflectivity at visible wavelengths since the layers are quarter-wave thickness at the pump wavelength but only about a 20th-wave thickness at the infrared laser wavelength. Hence the thin film stack is too thin to significantly perturb the high transmission of the plate 28 at the infrared laser wavelength. Suitable coating materials should have negligible infrared absorption and may be selected from the group including $CaF_2$, $LaF_3$, $NaF$, cryolite, $CeF_2$, $BaF_2$, and $PbF_2$. At the present time a $CaF_2$ plate having an eleven-layer dielectric stack 32 is preferred because of its relatively low cost, good visible transmissivity and modest Brewster angle. Of next preference is a $Z_nS_e$ plate which is also coated with a dielectric thin film stack. In the case of the coated $CaF_2$ plate the reflectivity for the visible pump is about 95%, while the loss in the P polarized laser beam is less than 0.2% over the entire infrared wavelengths which the laser may be tuned (viz, from 2.2 to 3.2 microns). Accordingly, the coupling efficiency of the pump energy into the laser medium 24 is very high. Other coating materials may be used depending upon the wavelength of the laser beam. For example, fused silica and $MgF_2$, which are excluded in the case of the herein described laser because their absorption by residual water at 2.7 micron wavelengths.

Figure 3:
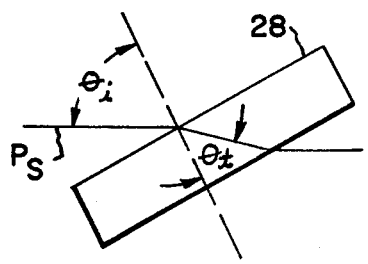
FIG. 3 is an illustration of the polarization beam splitter used in the laser apparatus shown in FIG. 1 which is enlarged to explain its design and orientation.

The orientation of the beam splitter which determines its reflectivity for S polarization depends only upon the index of refraction of the material. Consider the case where the beam splitter 28 is uncoated (see FIG. 3). Then the reflectivity R is determined by the angle of incidence $\phi_i$ and the angle of refraction $\phi_t$ which in turn depend upon the index of refraction in accordance with the following relationships $R = \sin^2(\phi_i - \phi_t)$ $\phi_i = \tan^{-1} n$ $\sin \phi_i = n \sin \phi_t$, where n is the index of the refraction of material.

Figure 2:
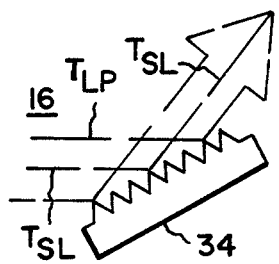
FIG. 2 is an illustration of a portion of the optical cavity of a laser similar to the laser shown in FIG. 1 but having an output reflector provided by a grating rather than a partially reflective mirror, in accordance with another embodiment of the invention.

FIG. 2 shows how the tuning element 30 and the reflecting element (provided by the mirror 22 in FIG. 1) can be provided as a single element. This single element is a reflectance grating 34 which reflects the laser beam $T_{LP}$ back into the cavity 12 along the optical path in the arm 16. The grating 34 also serves as an output coupler for the laser beam and the visible pump beam tracer $T_{SL}$, since the 0th order of the grating 34 reflects the laser beam and the visible pump tracer beam to provide the output from the laser. The grating may be rotated for tuning purposes. The visible tracer shows the location of the laser beam and may be used for alignment purposes.

The first mirror 18 may be made totally reflecting. This is especially desirable with the grating/tuning element 34. With a totally reflecting mirror 18, all of the pump light not absorbed by the laser medium crystal 24 in the first pass is reflected back into the crystal 24 for another absorption. The pump energy is then even more efficiently utilized and laser medium crystal having lower absorption coefficients may be used or the crystal may be pumped at a wavelength where it is not so strongly absorbing, thus increasing the class of useful pump lasers. Moreover all of the optics in the vacuum chamber will then be total reflectors making mirror changeover for the purpose of operating in different spectral regions unnecessary.

From the foregoing description it will be apparent that there has been provided improved laser apparatus wherein a pumping of a laser which operates at in visible wavelengths is provided colinearly so as to permit the pump wavelengths to serve as a visible tracer for the location and alignment purposes and affords an efficient means for pumping a laser. While the invention has been described in connection with an F color center laser it will be appreciated that other lasers may use the invention and that variations and modifications of the herein described laser apparatus will also suggest themselves to those skilled in the art. Accordingly, the foregoing description should be taken merely as illustrative and not in any limiting sense.

What is claimed is:

1. Laser apparatus which comprises at least a first reflector and a second reflector having reflecting faces opposing each other to define an optically resonant cavity having an optical path between said reflectors, at least one of said reflectors having means for coupling light out from said cavity, an active laser medium in said cavity and disposed along said path which emits a first beam of laser light of one polarization along said path when pumped, a laser pump source which produces a second beam of laser light, and a Brewsters angle polarization beam splitter in said cavity having a surface from which light of polarization opposite to said one polarization is reflected, said reflecting surface facing said pump source and being disposed at Brewsters angle with respect to said second beam and upon which said second beam is incident and from which said second beam light which is of said opposite polarization to the polarization of said first beam is reflected colinearly with said first beam toward said laser medium to pump said laser medium.

2. The invention as set forth in claim 1 wherein said laser medium is a crystal disposed at Brewsters angle with respect to said optical path of said cavity, with a predetermined one of its crystal axes along said path and with respect to the polarization of said second beam such that said polarization falls along said predetermined one of said axes.

3. The invention as set forth in claim 2 wherein said laser medium crystal is a crystal having an F color center.

4. The invention as set forth in claim 3 wherein said pump source is a krypton gas laser.

5. The invention as set forth in claim 1 wherein said first and second reflectors are a pair of flat mirrors, the one of said pair of mirrors which provides said one reflector being partially reflecting to provide said coupling means, the other of said pair of mirrors being substantially totally reflecting, said beam splitter being disposed between said laser medium and said one of said pair of mirrors.

6. The invention as set forth in claim 5 further comprising a lense between said pump source and said beam splitter for focussing said second beam at said laser medium.

7. The invention as set forth in claim 1 wherein said beam splitter is also disposed at Brewsters angle with respect to said optical path in said cavity, such that said beam splitter is also disposed at Brewsters angle with respect to said first beam.

8. The invention as set forth in claim 7 wherein said beam splitter is a body of such material and thickness that said body is transmissive of light of the wavelength emitted by said laser medium and partially transmissive of light of the wavelength of said second beam from said laser pump source.

9. The invention as set forth in claim 8 wherein said body is a plate of material selected from the group consisting of $CaF_2$, ZnSe, $BaF_2$, Si and Ge.

10. The invention as set forth in claim 9 wherein said plate has a coating on the surface thereof which provides said reflecting surface and on which said second beam from said pump source is incident consisting of a plurality of thin films of dielectric material each of which has a thickness of about one quarter wavelength of said second beam of light.

11. The invention as set forth in claim 8 wherein said body is a plate and said material is selected from the group consisting of $CaF_2$, ZnSe and $BaF_2$, and said plate has a dielectric thin film coating reflective at the wavelength of the light of said second beam.

12. The invention as set forth in claim 11 wherein said material is $CaF_2$.

13. The invention as set forth in claim 1 wherein said one of said reflectors which provide said coupling means is a reflectance grating having a grating surface facing into said cavity.

14. The invention as set forth in claim 1 further comprising a third reflector having a reflecting face opposing the reflecting face of said first reflector, said first and second reflectors defining a first arm of said cavity and said first and third reflectors defining a second arm of said cavity, said beam splitter being disposed in said first arm, said first reflector being a mirror with a concave reflecting surface facing said beam splitter and said laser medium and having a focus for said first and second beams at said medium.

15. The invention as set forth in claim 14 wherein said first and third reflectors are both concave mirrors having radii $R_2$ and $R_1$ respectively, said second reflector being a flat mirror.

16. The invention as set forth in claim 15 wherein said laser medium is located in said second arm at a distance $R_2/2$ from said first reflector mirror of radius $R_2$ and at a distance $R_1$ from said second reflector mirror of radius $R_1$.

17. The invention as set forth in claim 14 further comprising wavelength tuning means in said first arm.

18. The invention as set forth in claim 17 wherein said second reflector has as the surface thereof facing said cavity a reflectance grating.

19. The invention as set forth in claim 14 wherein both said first and third reflectors are concave mirrors and said second reflector is a flat mirror, said flat mirror being partially transmitting at the wavelength of both the light from said first beam and the light from said second beam.

20. The invention as set forth in claim 14 wherein said second arm, including said first and third reflectors and said laser medium, is adapted to be located in a vacuum chamber.

21. The invention as set forth in claim 1 wherein said pump source has means for producing light of said second beam which is visible and provides a visible tracer for said first beam, and said laser medium is of such material that produces light of said first beam which is in the infrared.

* * * * *